United States Patent [19]
Chao et al.

[11] Patent Number: 5,964,837
[45] Date of Patent: *Oct. 12, 1999

[54] COMPUTER NETWORK MANAGEMENT USING DYNAMIC SWITCHING BETWEEN EVENT-DRIVEN AND POLLING TYPE OF MONITORING FROM MANAGER STATION

[75] Inventors: Chih Wei Chao, Santa Clara, Calif.; William Tsun, Cary, N.C.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/495,383

[22] Filed: Jun. 28, 1995

[51] Int. Cl.$^6$ .................................................. G06F 11/00
[52] U.S. Cl. ................................. 709/224; 709/225
[58] Field of Search ................... 395/200.02, 200.06, 395/200.11, 200.5, 200.55, 200.54, 200.2; 348/825–825.88; 709/224, 225, 220

[56] References Cited

U.S. PATENT DOCUMENTS

| | | | |
|---|---|---|---|
| 3,684,871 | 8/1972 | Schaffner | 395/103 |
| 4,827,411 | 5/1989 | Arrowood et al. | 707/206 |
| 5,049,873 | 9/1991 | Robins et al. | 340/825.06 |
| 5,130,983 | 7/1992 | Heffner, III | 370/449 |
| 5,276,789 | 1/1994 | Besaw et al. | 395/140 |
| 5,319,633 | 6/1994 | Geyer et al. | 370/254 |
| 5,448,724 | 9/1995 | Hayashi | 395/182.02 |
| 5,561,769 | 10/1996 | Kumar et al. | 395/200.05 |
| 5,568,605 | 10/1996 | Clouston et al. | 395/200.06 |
| 5,592,620 | 1/1997 | Chen et al. | 395/200.01 |
| 5,594,426 | 1/1997 | Ushijima | 340/825.02 |

OTHER PUBLICATIONS

IBM Technical Disclosure Bulletin, vol. 35, No. 6, Nov. 1992, "Hybrid Topology Database Algorithm".

IBM Technical Disclosure Bulletin, vol. 36, No. 7, Jul. 1993, "Dynamic Collection of Advanced Peer–to–Peer Networking Network Topology and Graphical Display on a Programmable Workstation".

Publication by W. Chao and W. Tsun, May 1, 1995, "Event Driven Network Topology Monitoring Function".

L. Crutcher et al. [management & control for Giant Gigabit Netwrok] IEEE comm. Mag. vol. 7, No. 6, pp. 62–71, Nov. 1993.

Rose [The Simple Book] p. 76 Printice Hall Inc. Englewood Cliffs, N.J., 1994.

IBM [APPNTAM Feature Implementation Guide, Version 2, Release 4] pp. 2, 85, Jan. 1994.

*Primary Examiner*—Richard L. Ellis
*Assistant Examiner*—Gautam R. Patel
*Attorney, Agent, or Firm*—Felsman, Bradley, Vaden, Gunther & Dillon

[57] ABSTRACT

A method of monitoring the topology of a network uses dynamic switching between a polling mode and a event-monitoring mode. The network is of the type having point-to-point connections between a number of nodes. In the polling mode, a manager coupled to one of the nodes sends a request to an agent in each of the nodes for information about operativeness of the node, its agent, and its connections to other nodes. All of this information is collected to generate a topology map, which may be visually displayed. In the event-monitoring mode, the manager waits for event-messages from the agents in the nodes, to update the topology map. The manager switches from event monitoring mode (which is more efficient) to polling (which is usually more accurate) in response to a number of factors, including the reachablity of the nodes, the manageability of the nodes, and the consistency of information received from various nodes. Reachability is an indication of whether an enabled connection exists from manager to node. Manageability means whether or not the node responds to requests from the manager.

18 Claims, 8 Drawing Sheets

| Table 1. Example of local connectivity information ||| 
|---|---|---|
| Trunk Endpoint | Operational Status | Partner Endpoint |
| t1 | enabled | (n2,t1) |
| t2 | enabled | (n3,t1) |
| t3 | disabled | (n4,t1) |
| t4 | disabled | -- |

COMPUTER NETWORK MANAGEMENT USING DYNAMIC SWITCHING BETWEEN EVENT-DRIVEN AND POLLING TYPE OF MONITORING FROM MANAGER STATION

BACKGROUND OF THE INVENTION

1. Technical Field

This invention relates to communications networks, and more particularly to a method for monitoring a network to generate topology information.

2. Description of the Related Art

An operator needs management information about a network to help conceptualize the network and call attention to adverse changes in a fast and accurate manner. A network could be a collection of voice, video, or data processing devices connected by communication lines. As the network complexity increases, it becomes more difficult to conceptualize how various pieces are laid out. One way to help the operator visualize the layout is to display a topology map showing each node and the connections which exist between the nodes. One system accomplishing this visual display is described using virtual-world technology to provide 3-D input and output capabilities to facilitate management tasks; this system is described by L. Crutcher et al, "Management and control for Giant Gigabit Networks," IEEE Commun. Mag., Vol. 7, No. 6, pp. 62–71, November 1993.

The topology map needs to reflect the actual network topology and its current status in real-time, as accurately as possible, so an operator can respond quickly to possible network trouble spots. This need is most evident in broadband networks where an outage would impact many end-to-end connections. In addition, each connection may suffer large amounts of information loss before the source can be suspended or an alternate path can be established to re-route traffic.

To build and continuously update the topology map, information must be collected from each network node. The challenge is to do this in real time without adversely consuming network bandwidth. The simple polling approach to gather network information has severe problems in wasting network bandwidth, as described in Rose, "The Simple Book," p. 76, Englewood Cliffs, N.J.: Printice Hall Inc. This is of special concern in wide-area networks where recurring transmission line expenses directly affect the cost of network operation. Bandwidth used by management traffic comes at the expense of user bandwidth. Even in broadband networks, such as ATM networks, minimizing management bandwidth usage is a concern. A requirement for one standard (ATM forum's requirement for ILMI) is that management traffic be less than one-percent of line capacity. Since topology monitoring is but one part of the overall management function, it is necessary to minimize traffic generated by the topology application.

In the system of this invention, topology management monitors point-to-point networks in which each node only contains information concerning its neighboring nodes. This simplifies the node's implementation and thus reduces its cost. Existing monitoring systems for point-to-point networks utilize either polling or event-monitoring modes, as will be described.

In a point-to-point network, typically seen in a WAN, one link or trunk directly connects two network nodes, and this trunk connection established between two nodes is not shared with other nodes. Due to transmission line costs, each node has a relatively small number of trunk connections. In some point-to-point network architectures, each node maintains an updated copy of the entire network topology. Therefore network topology monitoring can be performed by collecting information form only one network node, or two to verify the integrity of the information. One example is a feature of an IBM system called APPN Topology and Accounting, described in APPNTAM Feature Implementation Guide, Version 2 Release 4, pp. 2,85, January 1994. The APPNTAM employs event monitoring, but unlike this invention, requires each network node to have a full topology.

SUMMARY OF THE INVENTION

It is therefore one object of the present invention to provide an improved method of monitoring a point-to-point network.

It is another object of the present invention to provide an improved method of generating topology information for a network.

It is yet another object of the present invention to provide a method of monitoring a network and generating topology information without creating an undue load of the network resources.

The above as well as additional objects, features, and advantages of the present invention will become apparent in the following detailed written description.

According to one embodiment of the invention, a method of monitoring the topology of a network uses dynamic switching between a polling mode and a event-monitoring mode. The network is of the type having point-to-point connections between a number of nodes. In the polling mode, a manager coupled to one of the nodes sends a request to an agent in each of the nodes for information about operativeness of the node, its agent, and its connections to other nodes. All of this connectivity information is collected to generate a topology map, which may be visually displayed. In the event-monitoring mode, the manager waits for event-messages from the agents in the nodes, to update the topology map. The manager switches from event-monitoring mode (which is more efficient) to polling (which is more accurate for a brief time after a poll) in response to a number of factors, including the reachablity of the nodes, the manageability of the nodes, and the consistency of information received from various nodes. Reachability is an indication of whether an enabled connection exists from manager to node. Manageability means whether or not the node responds to requests from the manager.

The invention illustrates that by interchangeably using polling and event monitoring modes, an accurate and up-to-date topology map can be maintained while minimizing network management traffic. The method favors event monitoring and resorts to polling monitoring only when conditions for event monitoring are not satisfied.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figures 1, 2:
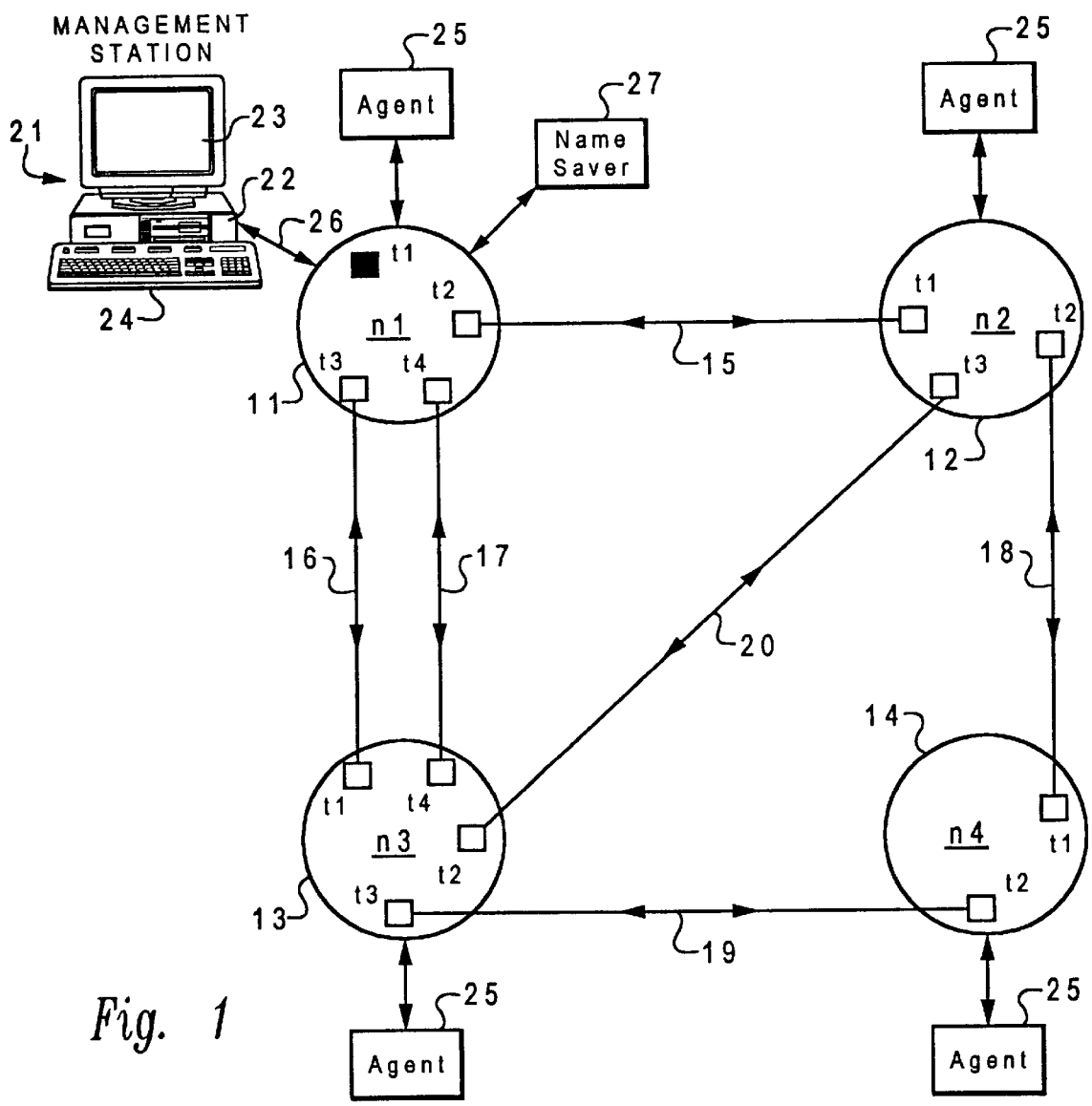
FIG. 1 is a diagram of a communications network which may use the features of one embodiment of the present invention.
FIG. 2 is a table of an example of local connectivity information in a node of the network of FIG. 1.

Referring to FIG. 1, a network 10 is illustrated which may use features of the invention. In this example, the network includes four nodes 11, 12, 13, and 14, also referred to as nodes n1, n2, n3, and n4. Each node is a network switch, often a computer, i.e., a data processing system which is capable of executing various tasks and processes, including that of sending messages to other nodes and responding to messages from other nodes. This network 10 is of the point-to-point type, in that there is a defined path or link between each node 11–14 and each one of the other nodes that is a partner. For example, there is a link 15 between n1-node 11 and n2-node 12; this link is also referred to as a trunk connection. Each node has one or more endpoints labelled t1, t2, etc., representing a possible connection to a point-to-point link. The link 15 is between endpoint t2 in n1-node and endpoint t1 in n2-node 12. Similarly, n1-node 11 may be connected to n3-node 13 by links 16 and 17 between separate endpoints, and n2-, n3-, and n4-nodes 12, 13 and 14 interconnected on a point-to-point basis by links 18, 19 and 20 between specific endpoints in the nodes. The links or trunk connections 15–20 may be constructed using any communication medium commonly used in networks, e.g., buses between computers, telephone lines, T1 trunk connections, satellite links, or other such links. The network 10 of FIG. 1 is what is generally termed a WAN or wide area network, although the principles herein described could be used in a local area network interconnected by Ethernet or token ring technology, in some situations. Each one of the nodes 11–14 is usually connected to other nodes or terminals (workstations, desktop computers, printers, system resources, etc.), not shown, by local area networks or the like, and it is of course understood that a typical network in which the invention is useful may have a large number of nodes, spread over sites that may be local or separated by long distances. The illustration of FIG. 1 shows all of the nodes, endpoints and links in an operational state; in the following discussion, examples are given for various states where some equipment is down, non-operational.

According to the invention, a management station 21 is connected to n1-node 11. The management station is illustrated as a workstation or computer terminal having a system unit 22, a monitor 23, and a keyboard 24. Of course, the management station 21 may be a task executing on the same computer that executes the n1-node 11, for example. Only one management station is shown, but other nodes in the network 10 could be functioning separately as management stations. The management station 21 is an applications program executing on a platform or general purpose processor, and has the functions of (1) executing network operator commands, i.e., those issued by a human operator, (2) communicating with the managed network 10 by messages, ordinarily using packet technology, (3) retrieving management information from other nodes, via the communication links, using messages, such as inquires and responses, (4) presenting the topology of the network in graphical form such as on the monitor 23 or by printed output, and (5) otherwise to display or present network status information. Each of these functions is performed using conventional technology which is not treated here. The information generated by the manager 21 can be made available to other management functions such as accounting, connection, performance, etc.

Each one of the nodes 11–14 has a special management application called an "agent" runmning locally, illustrated by agents 25 in FIG. 1. The main functions supported by an agent are: (1) maintain real time management information related to the networking functions of its own node, locally, (2) receive messages from and send messages to the manager station 21, (3) respond to requests for information retrieval from the manager 21, via these messages, and (4) emit unsolicited notifications (messages) when defined events such as trunk outage occur. As will be explained, the main inquires are whether the node is operational or not, whether each endpoint is operational, what other nodes this node is connected to in an operational manner, etc.

The manager 21 needs to establish a connection with each agent 25 in order to exchange this information. The manager is external to the network, i.e., it could be connected to the network 10 via a communications link to one of the nodes. Thus, one of the nodes is assigned as the gateway; in FIG. 1 the n1-node 11 is the gateway for manager 21, and the path 26 can be a bus connection, or a connection by a LAN, or the like, i.e., this connection need not be direct. All communication between the manager 21 and the agents 25 must go through the gateway n1-node 11, via path 26 and the links or trunks 15–20; if this gateway fails, another node may be activated to take over, but there is only one gateway in a network at any one time for a given manager. Other management stations (not shown) may use the same or different nodes as gateways.

The relationship between manager 21 and agents 25 is similar to a client/server relationship where the manager 21 is the client and the agent 25 is the server. In most cases, the server is activated first and requires no client information or client presence to become operational; once it is operational, it waits to provide services to its clients. On the other hand, the client is usually activated with some information about the server and cannot perform meaningful tasks until the server is available. An agent application 25 is typically activated as part of the start-up procedure of its network node 11–14; however, it may be stopped and reactivated anytime independent of the manager 21 it also does not require any information about the manager 21. The job of the agent 25 is to make a set of supported management information available to the manager 21 on request. Configuration information such as network node addresses is required by the manager 21 to establish connection with each agent 25. To this end, a name server 27 or the like is available as a resource to the manager 21, as by a task operating on the n1-node 11, although it could be anywhere accessible to the manager 21 on the network. The name server 27 maintains a database of the name and address of each potentially-active node on the network, and of course at any given time less than all of these nodes will be active. If a manager 21 is interested in subscribing to unsolicited notifications from agents 25, it must inform each agent 25 (obtaining the node name and address from the name server 27) giving the address of manager 21 and specifying the type of information of interest. The manager 21 should terminate its subscription when the node is no longer of interest to avoid unwanted notification messages from entering the network and thus generating loading.

In a point-to-point network 10, the network topology information available at each node 11–14 could be the entire network topology, or could be only local connectivity, depending on the architectural design of the network. For the system of the invention, it is assumed that the network nodes 11–14 are only required to have local connectivity information. At each node 11–14, the agent 25 maintains management information related to each of its trunk endpoints. A trunk endpoint such as t1, t2, etc., in a node is a resource that could be connected to a trunk endpoint of another of the nodes via a link 15–20 to form a trunk connection. When a trunk connection is established, e.g., between t1 of n2 and t2 of n1 via link 15, the two trunk endpoints are said to be in partnership with one another. Each trunk endpoint must contain the following information: (1) its own name, (2) its node's name, (3) partner's trunk endpoint name, (4) partner's node name, and (5) operational state. At any given time, a trunk endpoint may have valid, invalid, or no partner information; invalid information occurs when the alleged partner no longer exists or it does not reveal the alleged connection. The operational state can be either "enabled" or "disabled," and a trunk endpoint without a partner is defined to be disabled, i.e., an enabled trunk endpoint must have a partner. Local connectivity information maintained at an agent 25 is the collection of all this information for trunk endpoints t1, t2, etc., for a given node. Using the notation (n, t) to denote a trunk endpoint t in node n, Table 1 of FIG. 2 shows an example of local connectivity information which might be maintained by one of the agents 25 of FIG. 1, assuming that two endpoints t1 and t2 are enabled and two endpoints t3 and t4 are disabled.

A topology map is a collection of this local resource information such as that of FIG. 2, for all nodes 11–14 in the network 10, combined and presented to the user in graphical form; resources include nodes, trunk connections, and their status, as seen in FIG. 2. The status of a node is either "manageable" or unmanageable", depending upon whether the node's agent 25 is responding to management requests from the manager 21. The existence of trunk connections cannot be obtained by merely querying the agents 25, since agents are only aware of local connectivity, e.g., the information of FIG. 2. Because trunk endpoints t1, t2, etc., which form trunk connections are located in different nodes 11–14 as seen in FIG. 1, it is possible that the local connectivity information retrieved from these nodes is inconsistent. For example, if a trunk connection between two endpoints fails to function normally, one of the trunk endpoints may be removed, or it may form a new trunk connection with a different trunk endpoint. In either case, the partner information in the other node will be incorrect. Also it is possible that two trunk endpoints have different operational states; this occurs when each end detects the failure of the trunk connection at a different time.

When an inconsistency is detected in local connectivity information of FIG. 2 retrieved from different nodes 11–14, certain rules ar used by the manager 21 to resolve the conflict. First, a trunk connection is created in the topology map between two manageable nodes if there is a trunk endpoint in each node having each other as partner. If the operational state of these two trunk endpoints are inconsistent, then the resulting status of the trunk connection will be set to disabled. In other words, the trunk connection in a topology map will be set to disabled as long as one of the trunk endpoints are reported as disabled. Only when both trunk endpoints are enabled is a trunk connection set to enabled in FIG. 2.

Figure 3:
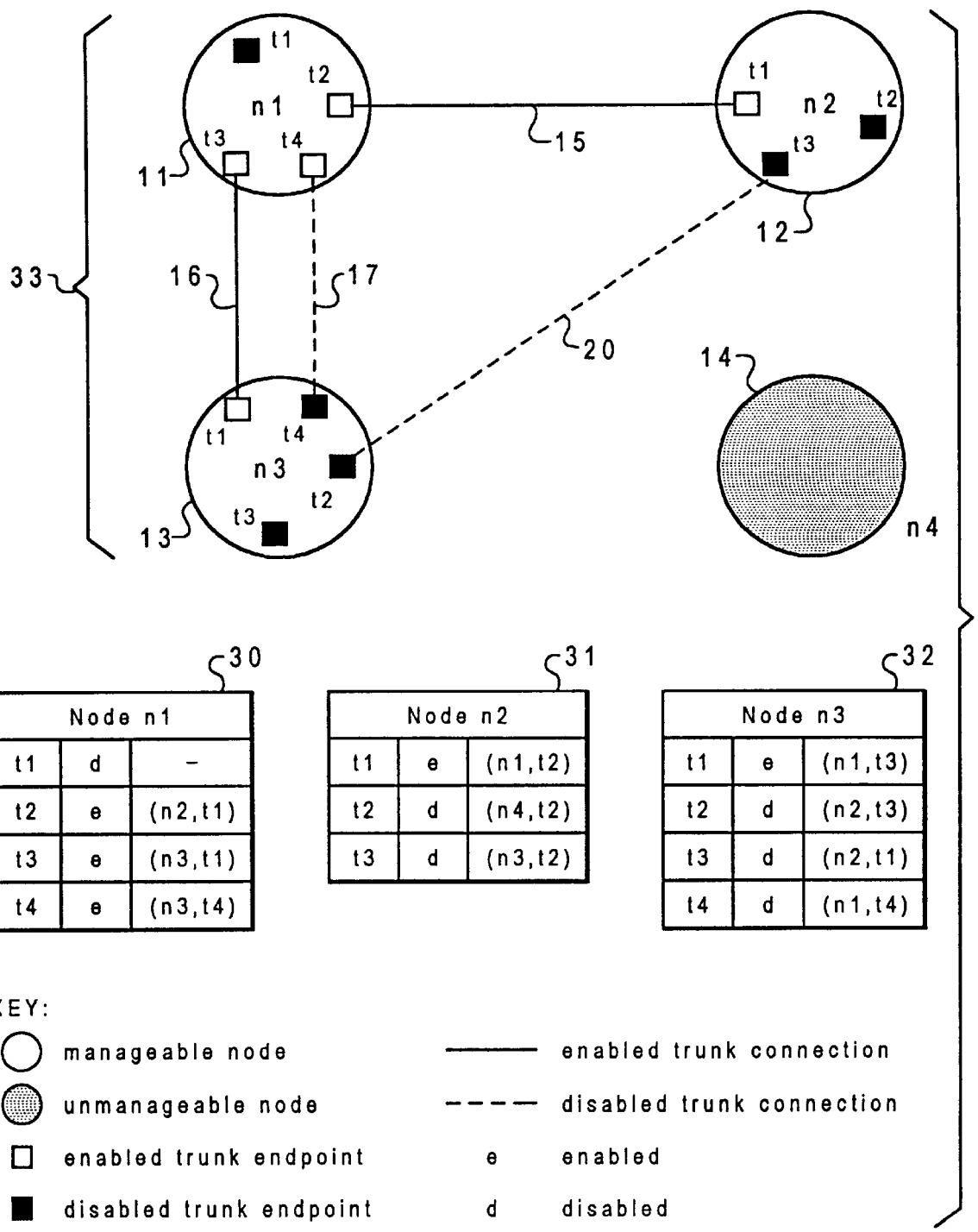
FIG. 3 is a diagram of local connectivity for all of the nodes of a network similar to that of FIG. 1, along with a topology diagram produced by operation of the invention.

Referring to FIG. 3, an example network similar to that of FIG. 1 is shown with the local connectivity information of each manageable node n1, n2, and n3, and the resulting topology map created by the manager 21. Here it is seen that (contrary to FIG. 1) the n4-node 14 is down, inoperable, as far as the network is concerned (although it may be operating locally), and links 17 and 20 are down. The information of FIG. 3 includes the local connectivity information blocks 30, 31, and 32, maintained by agents 25 for the n1-, n2-, and n3-nodes 11, 12, and 13, respectively, and sent to the manager 21 in response to inquiry, and the composite visual representation 33 which could be displayed or printed by the manger 21. As illustrated here, the trunk endpoints t1, t2, etc., are shown together with the topology map 33, but the map may contain only nodes and trunk connections 15–20 between nodes, if desired, and the trunk endpoints shown in a separate window. The n4-node 14 is seen to be unmanageable and is shown hatched or in a different color on the screen or printout from manager 21.

According to the invention, a combination of polling and monitoring, dynamically switched, is used. First, a snapshot is employed. A snapshot action is a task performed by the manager 21 to obtain a best-effort topology of the network 10. First, a request for local connectivity information (FIG. 2 information) is sent to all nodes 11–14 currently configured in the network; the addresses for this request are obtained by the manager 21 from the name server 27, for example, or from the last available information. The returned information from the agents is processed by the manager and the resultant topology map of FIG. 3 is created.

A simple method of "polling monitoring" could be used to maintain the topology map of FIG. 3. This type of monitoring is accomplished by merely periodically performing a snapshot as just described. This method is the most simple to implement for both the manager 21 and the agents 25. The disadvantage is that the accuracy of the topology map depends upon the granularity of the polling interval, i.e., upon how often the snapshot is requested. As the frequency of polling is increased, the accuracy increases, but more network bandwidth is consumed by management traffic. Thus, a practical limit is imposed on the snapshot frequency.

A second approach to maintaining the topology map of FIG. 3, is to have the manager 21 perform a snapshot to create an initial topology map, and thereafter each agent 25 emits an "event" message whenever changes to its local connectivity information of FIG. 2 are detected. The manager 21 updates the topology map of FIG. 3 based upon received event messages. Should an agent 25 in a reachable node 11–14 abort without notice, i.e., with no event message, this must be detected by an "agent liveliness mechanism" as will be described later. The method of this second approach is referred to as "event monitoring."

Event monitoring has several advantages over polling monitoring. First, the manager 21 need not perform snapshots as frequently as required in polling, while maintaining a more accurate topology map; as soon as a change occurs and an event message received, the map can be updated, rather than waiting for a polling interval to expire. Management traffic in the network 10 is reduced because unnecessary snapshots are not performed, such as when the network goes for long periods with no changes. In addition, the network bandwidth consumption used to transport the event messages for topology change events is significantly reduced compared to a network-wide snapshot request/response which entails a message to every node and a response from every node. A second point is that a continuous network topology history may be maintained by event monitoring, as opposed to a sequence of samples. In event monitoring, if no event message is received, then the network experiences no change. In polling monitoring, if consecutive snapshots result in two identical topology maps, it cannot be asserted that a network change has not occurred (although it is likely no change occurred); this continuous-history information may be critical to other management functions (e.g., accounting) that are inherently continuous.

In event monitoring, it is critical that all topology change events are received by the manager 21. A management protocol can provide reliable transport of events once sent as messages from agents 25, as described in CCITT Recomendation X.734(1992) ISO/IEC 10164-5:1992, Information technology—Open Systems Interconnection—Event report management function. However, there is no guarantee that all the agents 25 will always be able to report local connectivity changes. Consider the case when an agent application 25 aborts (and thus emits no notice of its failure). If the networking functions of the node 11–14 continue to operate and all the trunk endpoints remain enabled, their partner endpoints in adjacent nodes will not detect any failure. Hence, no topology event messages are emitted from the adjacent nodes. The manager 21 will not be made aware of the absent agent until another snapshot is performed. Before the snapshot, the local connectivity is subject to change. A possible scenario is that a new trunk endpoint is created in the agentless node and subsequently forms a trunk connection to a new node. Since no event is emitted and the new node will not be contacted by the manager 21 as to where to send information, the topology map will not be updated to include the new trunk connection and the new node. Subsequently any other nodes activated and connected to the new node will not be discovered either. The inconsistency between the map and the actual network topology that should be seen by the manager 21 will not be corrected until another snapshot is performed, which will not happen if the manager is waiting for event messages. A blind spot will exist in the network. Thus, event monitoring has significant accuracy problems in some situations.

According to the invention, in order to take advantage of event monitoring and yet ensure the correctness of the resultant topology map, dynamic switching between polling and event monitoring is provided. When topology monitoring is started, a snapshot is performed by the manager 21 as discussed above. The manager then evaluates whether conditions are conducive to event monitoring. If not, then polling monitoring will be used and snapshot actions are performed periodically to create topology maps. At the end of each snapshot, the conditions for event monitoring are re-evaluated.

Once in the event monitoring mode, the manager 21 updates the topology map based on received events to maintain the topology history. In addition, the manager needs to constantly determine if event monitoring should be continued; if not, the monitoring mode is returned to polling. The algorithm for implementing this dynamic switching (described below in reference to FIGS. 9 and 10) uses certain definitions. A node 11–14 is defined as "reachable" if there is an "enabled" path between the manager 21 and the node, otherwise it is "unreachable."—note that this definition is independent of the agent 25. At the end of a snapshot, the status of each node is either "manageable" or "unmanageable," depending upon whether the local connectivity information of the node is successfully retrieved by the manager 21. A node is manageable if both of the following are true: (1) the node is reachable, and (2) the agent 25 of the node is actively running. Otherwise the node is said to be unmanageable.

Since all of the connections between a manager 21 and the agents 25 use paths which go through the gateway, i.e., through n1-node 11 in this case, a node 11–14 unreachable from the gateway is also unreachable from the manager 21. In cases where the first statement is false, i.e., the node is unreachable, these nodes are disconnected from the manager and no further update from them is possible until they become connected again. That part of the topology map 33 will be shown with markings which indicate that the information could be out-of-date, e.g., by a different color in a display. In cases where the second statement is false, i.e., the agent 25 in the node is not actively running, an incorrect topology map would be created if event monitoring is used, like for the scenario given above illustrating this problem. As long as there is one such unmanageable node in the network 10, it is possible that the manager 21 will lose events from that node without being aware of the situation. Therefore both of the following conditions have to be true for the manager 21 to use event monitoring: (1) condition-1—the gateway is manageable, and (2) condition-2—all the unmanageable nodes are unreachable. It is trivial to determine if condition-1 is met. But if there is any unmanageable node in the network 10, there is no apparent way the manager 21 can determine if an unmanageable node is unmanageable due to statement one being false (the node is unreachable) or statement two being false (the agent in the node is not actively running). The solution to this problem lies in the local connectivity information of the neighboring nodes.

Consider the following test when all local connectivity information has been collected: (1) given an unmanageable node m and a manageable node n; (2) if there exists a trunk endpoint t in node n such that (n, t) is enabled and has a partner trunk endpoint in node m, then it follows that node m is reachable from the manager; (3) thus node m violates condition-2. Note that this test is insufficient for identifying all reachable but unmanageable nodes. Consider an example shown in FIG. 4. In this network, the n1-node 11 is the gateway node for the manager 21, and is manageable; the local connectivity information 30 for the n1-node can be retrieved by the manager. The n2-node 12 and the n3-node 13 are both unmanageable because their agents are not active, and therefore the local connectivity information of these nodes are not available to the manager. The resulting topology map of a snapshot will look like the picture of FIG. 4. Using the above test, the n2-node 12 will be recognized by the manager 21 as reachable because an enabled trunk connection 15 exists between the n1-node and the n2-node. If an enabled trunk connection existed between the n2-node and the n3-node, then the n3-node would have been reachable from the manager; however, this trunk connection will not be detected by the manager because the local connectivity information of neither the n2-node or the n3-node is available to the manager 21. It can be shown that, given a manageable gateway node, at least one of the reachable but unmanageable nodes can be detected using the above test if any exist in the network 10.

FIG. 3 as discussed above shows a topology map created by a snapshot which satisfies event monitoring conditions if n4-node 14 is not the gateway. Note that even though the n2-node 12 has a trunk endpoint t3 whose partner is t2 in n3-node 13, the link 20 is disabled; also there is a disabled link (n2,t2)-(n4,t?), etc.; therefore this map does not violate condition-2.

Figure 5:
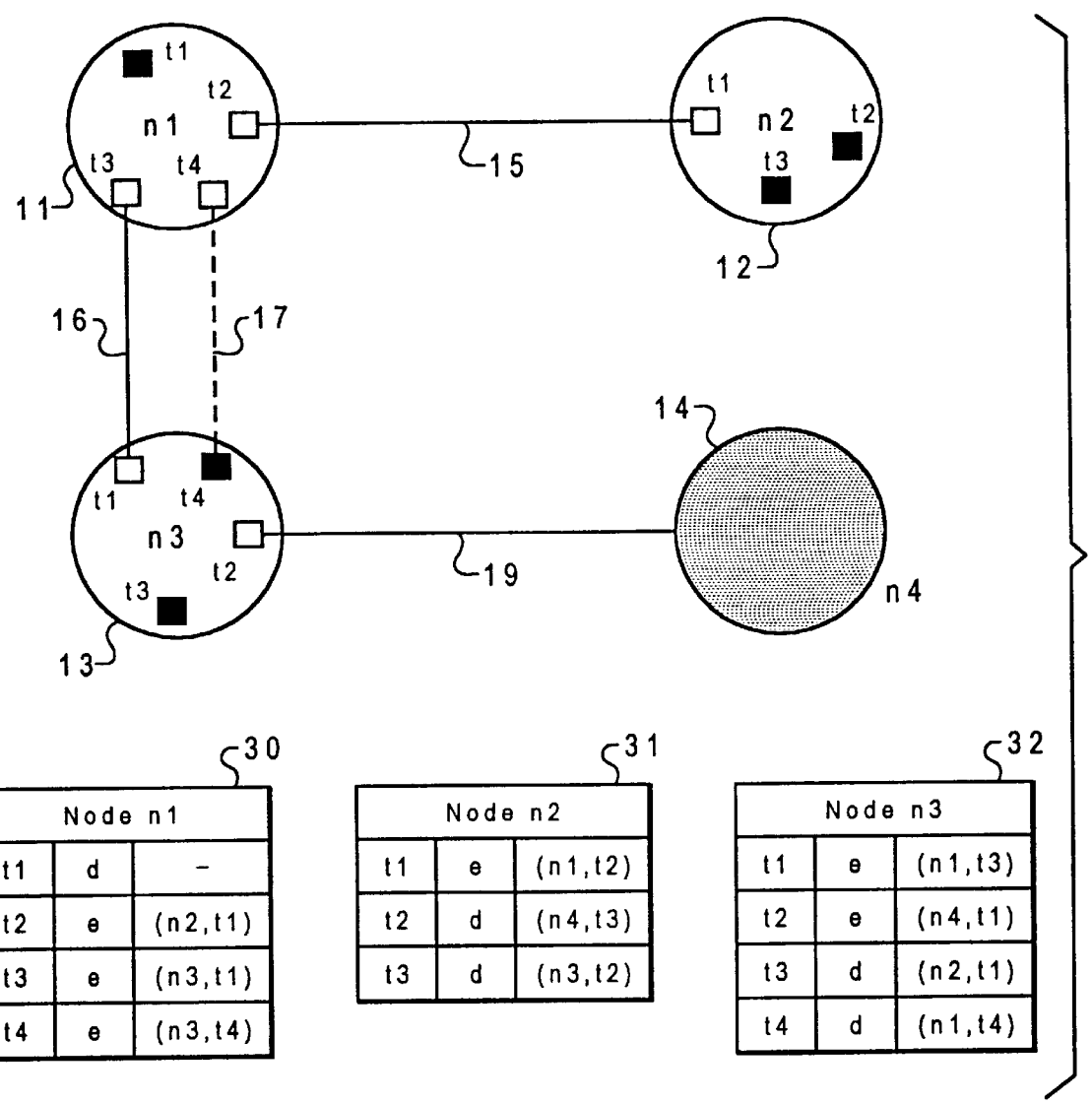
FIG. 5 is a diagram like FIGS. 3 and 4, for another different condition of operation of the network of FIG. 1.
Figure 4:
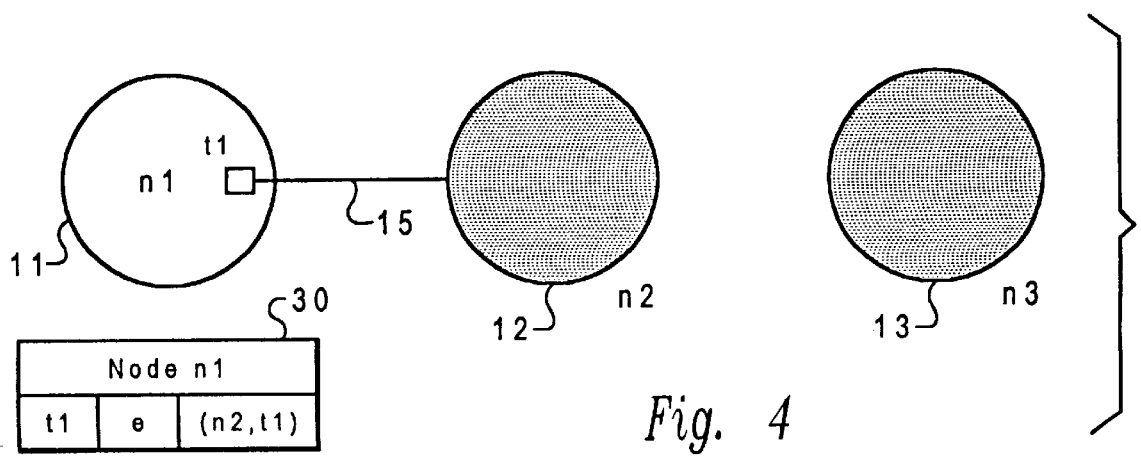
FIG. 4 is a diagram like FIG. 3, for a different condition of operation of the network of FIG. 1.

FIG. 5 shows another example of a topology map created by a snapshot, like FIGS. 3 and 4, but under different conditions. The n1-node 11 is the gateway as before. The n4-node is unmanageable but reachable via link 19 from the manager 21 through n3-node 13. Event monitoring conditions are not satisfied; there fore, polling monitoring must be used. Note that in this case it is still useful to display a trunk connection 19 in the topology map even though it cannot be verified with the agent 25 of the n4-node 14.

Summarizing the method according to the invention, as thus far described, the feature of dynamic switching between monitoring mode and polling mode is as follows: given that the gateway node (node 11 in FIGS. 1–4) is manageable, all agents 25 of manageable nodes are active, and all unmanageable nodes are not reachable (i.e., disconnected from the manager 21), then event monitor should be used; but if any agent 25 of the manageable nodes becomes inactive or any unmanageable nodes become reachable but with an inactive agent 25, then polling monitoring should be used.

Another feature of importance is "agent liveliness query." While in event monitoring mode, the manager 21 needs all agents 25 residing in manageable nodes to be continuously present. Otherwise, if an agent 25 aborts, or aborts and reactivates, then there exists a period of time where a reachable unmanageable node exists and an event from this node may be lost (or the node lost as discussed above). It is possible to design a protocol among agents so that agent failure could be detected and reported to other agents. However, the lack of a standard protocol among agents and the complexity of the agent makes this approach less attractive. So, according to one feature of the invention, another solution which is simpler and more robust is employed.

When event monitoring is started, the manager 21 periodically queries the agent liveliness from all currently manageable nodes 11–14. In each query, the manager 21 polls the agent start time or anything that is updated each time the agent 25 is restarted. For example, a local time stamp indicating the time of activation of the agent 25, or a counter indicating the number of times the agent 25 has been activated, serve this purpose. In cases where the agent 25 fails to function normally but does not abort, e.g., when an event message cannot be forwarded, the start time should also be updated to indicate the interruption of normal agent function. If any of the manageable nodes do not respond to the query, or if the returned value in any response is different from that of the previous query, then switching to polling monitoring is made immediately by performing a snapshot.

This agent liveliness query mechanism allows the manager 21 to ensure correctness while in event monitoring mode. The additional cost compared to pure event monitoring is the expense of polling the agent liveliness information. However, there is still a significant savings in network management traffic compared to a pure polling method. Consider several points. One, the information for each query response is considerably less than the local connectivity information of FIG. 2; there is only one small piece of information (the contents of a time-stamp register or counter register) regardless of how many trunk endpoints a node contains. Two, only currently manageable nodes are queried; the savings is directly related to the percentage of unmanageable nodes. Third, the frequency of agent liveliness queries need not be as high as that for local connectivity queries when the agent applications are relatively stable. Four, these three reasons all become more significant as the size of the network increases.

The trunk endpoint events reported to the manager 21 by the agents 25 will now be described. The manager 21 will update the topology map only when event messages are received. The following four trunk endpoint events are of interest: create, delete, enable, and disable. To simplify the implementation of the agent 25, a trunk endpoint t1, t2, etc., is created with disabled status and no partner; based on this, a create event does not affect the set of existing trunk connections in the network. When it forms a trunk connection with another trunk endpoint, an enable event (message) carrying the partner information is emitted by the agent 25 to be transmitted to the manger 21. A trunk endpoint should only allow deletion when its status is disabled; therefore, a disable event will always precede a delete event. When a delete event is received by the manager 21 form one of the agents 25, the trunk endpoint is removed from the topology map. If a trunk connection is anchored on one end by this trunk endpoint, it is removed from the topology map.

Processing these create and delete events by the manager 21 is straightforward. Enable and disable events, however, require additional processing. A disable event may result from a failed trunk connection, and this failure may cause a network partition. An enable event may reconnect a partition or be an indication that a new node has joined the network. A disable event (message) is processed as follows by the manager 21:

disable—upon receipt, check the operational status of the corresponding trunk connection; if status is enabled, change it to disabled.

Because the connection between the management station 21 and each agent 25 goes through the gateway, an agent 25 must be reachable from the gateway in order to communicate with the manager. Each time a trunk connection changes from enabled to disabled, a reachability tree, using shortest path tree algorithm (as described by Bertsekas et al, "Data Network," Englewood Cliffs N.J., Printice-Hall Inc., 1987, p. 322), with the gateway node as the root, is computed to determine if any node has become disconnected from the manager. Any disconnected node which is currently manageable is marked as unmanageable because it is not reachable from the manager 21. The trunk connections between two disconnected nodes or between one manageable node and one disconnected node will still be displayed in their state just prior to being disconnected. A different color or style is used on the monitor or printout to indicate the information is out-of-date. Updates to that part will not be possible until at least one of the disconnected nodes becomes connected again.

Figure 6:
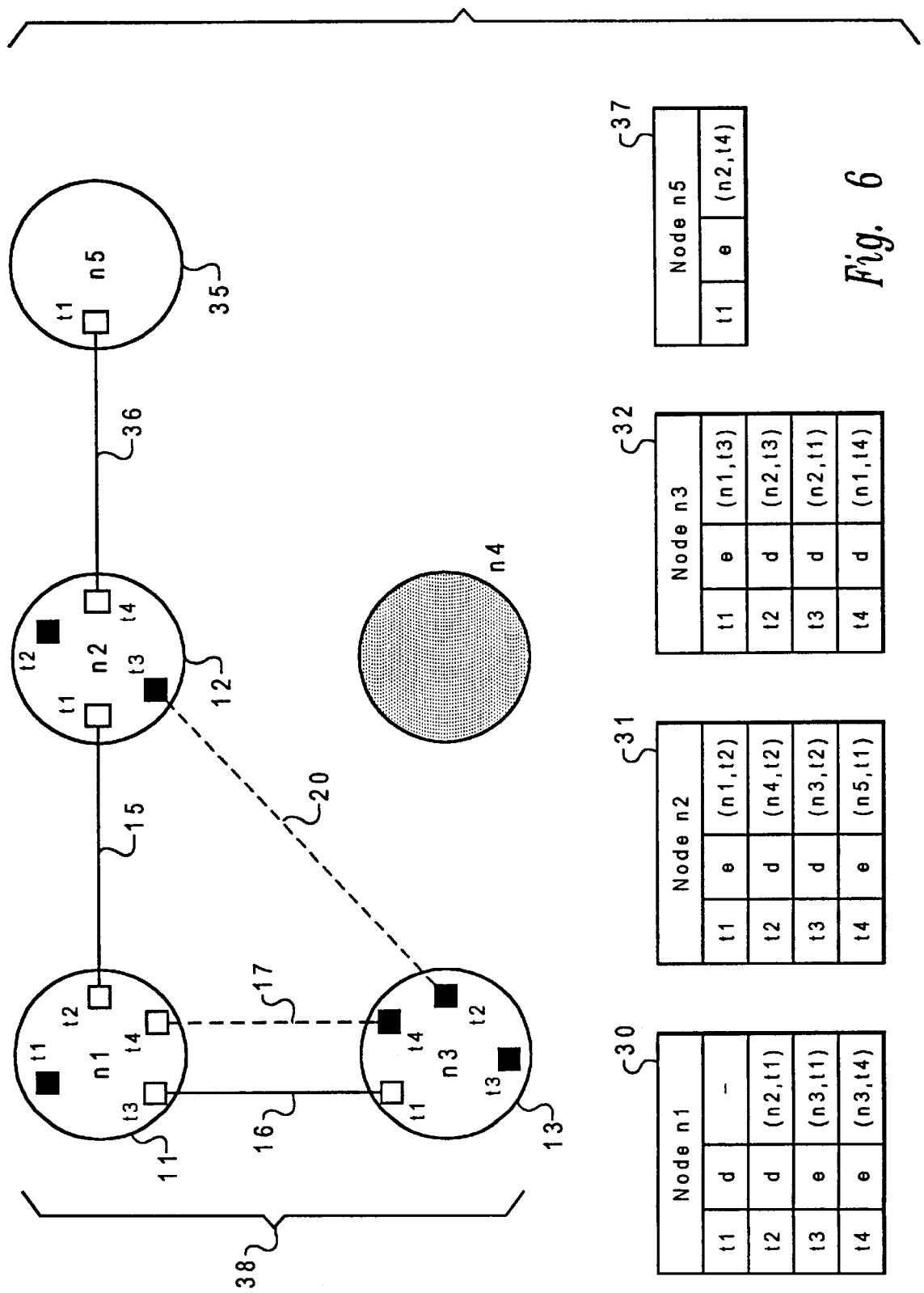
FIG. 6 is a diagram like FIGS. 3–5, for still another condition of operation of the network of FIG. 1.

To illustrate a trunk endpoint disabled event which results in a network partition, reference is made to the example shown in FIG. 6. This is the same network 10 as shown in FIGS. 1 and 3, with the following additions: a manageable n5-node 35, two enabled trunk endpoints (n5, t1) and (n2, t4), and a resulting trunk connection or link 36 between n2 and n5, are all added. The local connectivity information from each manageable node is shown in blocks 30, 31, and 32 as before, and the added block 37. The resulting topology map 38 is illustrated, as it would be displayed or printed by the manager station. Since the event monitoring conditions are met in FIG. 6, the manager 21 will be in the event monitoring mode.

Figure 7:
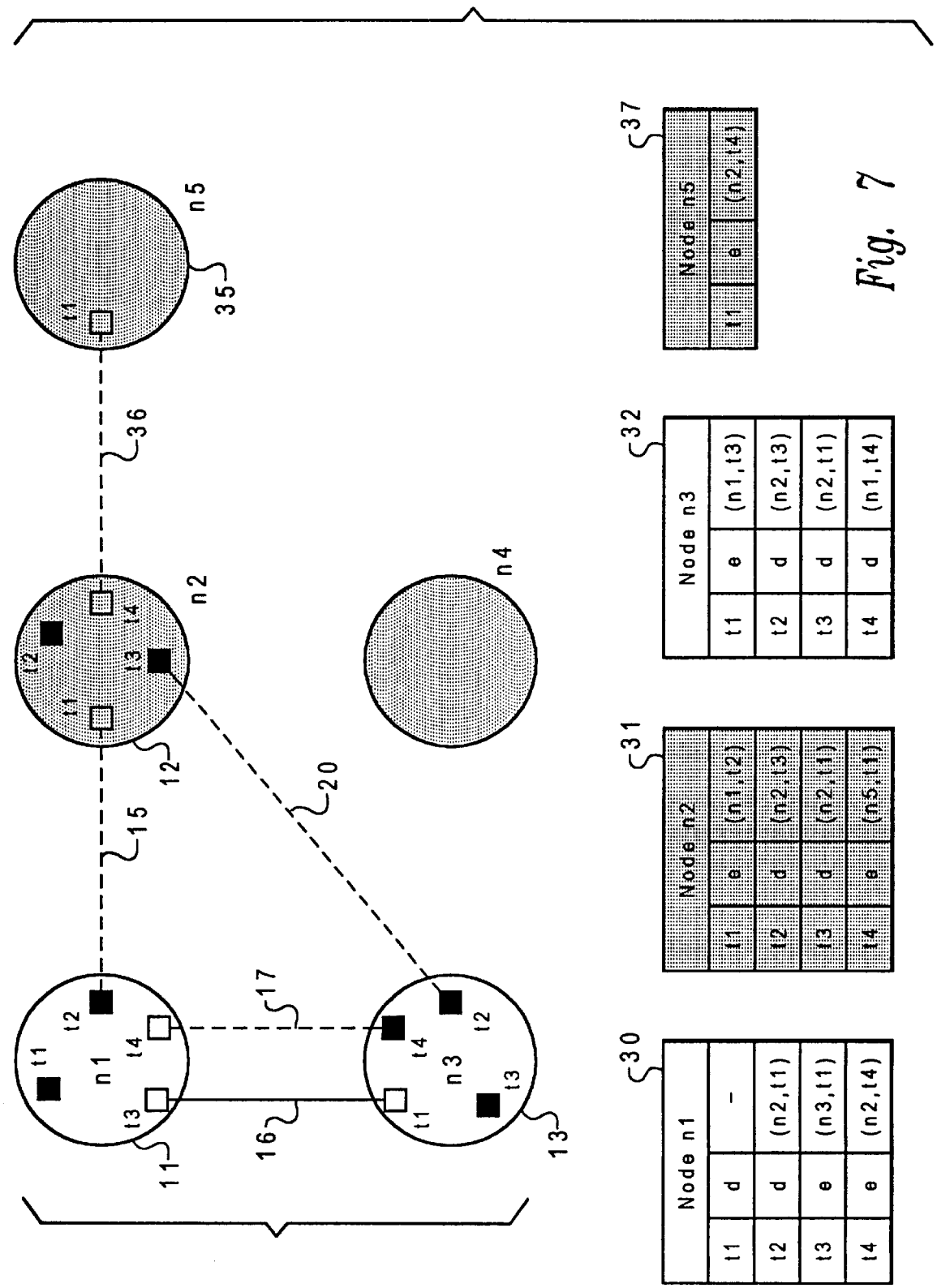
FIG. 7 is a diagram of the condition of FIG. 6, after operation of the manager of FIG. 1.

Next, with the topology map 38 as seen in FIG. 6, and event monitoring in effect at the manager 21, assume that a trunk endpoint disabled event (message) from (n1, t2) is received by the manager. The manager 21 will proceed as follows. First the status of the trunk connection between (n1, t2) and (n2, t1) as represented by line 15 is set to disabled. Then the reachability tree is computed using the gateway n1-node 11 as root and the status of all trunk connections in the network 10. The n2-node 12 and the n5-node 35 are then identified as disconnected nodes, and their status set to unmanageable. Any trunk connection with one of the endpoints in n2 or n5 will be marked differently in the map (as displayed or printed) to indicate that its status may be out-of-date. The resulting topology map, after the nodes have been disconnected, is shown in FIG. 7. The connectivity information of nodes n2 and n5 maintained by the manager are now obsolete.

Enable events (messages) are processed by the manager 21 as set forth in the following:

enable—upon receipt, the manager 21 verifies the partner information carried in the event message by checking the status of the partner trunk endpoint; if the partner exists and has consistent operational status and partner information, a trunk connection with enabled status is created if one does not already exist.

An operation of "discovering nodes" will now be described. If the partner information in the enable event indicates that the partner endpoint is currently in an unmanageable node or new node, then a discovery procedure is started from that node. First the local connectivity information is retrieved from the new or unmanageable node. If there exists a trunk endpoint in the explored node with enabled status and its partner trunk endpoint is in another new or unmanageable node, then continue exploration from that node. This procedure is applied recursively to discover all the unmanageable or new nodes that have just become manageable as a direct result of the enable event.

Figure 8:
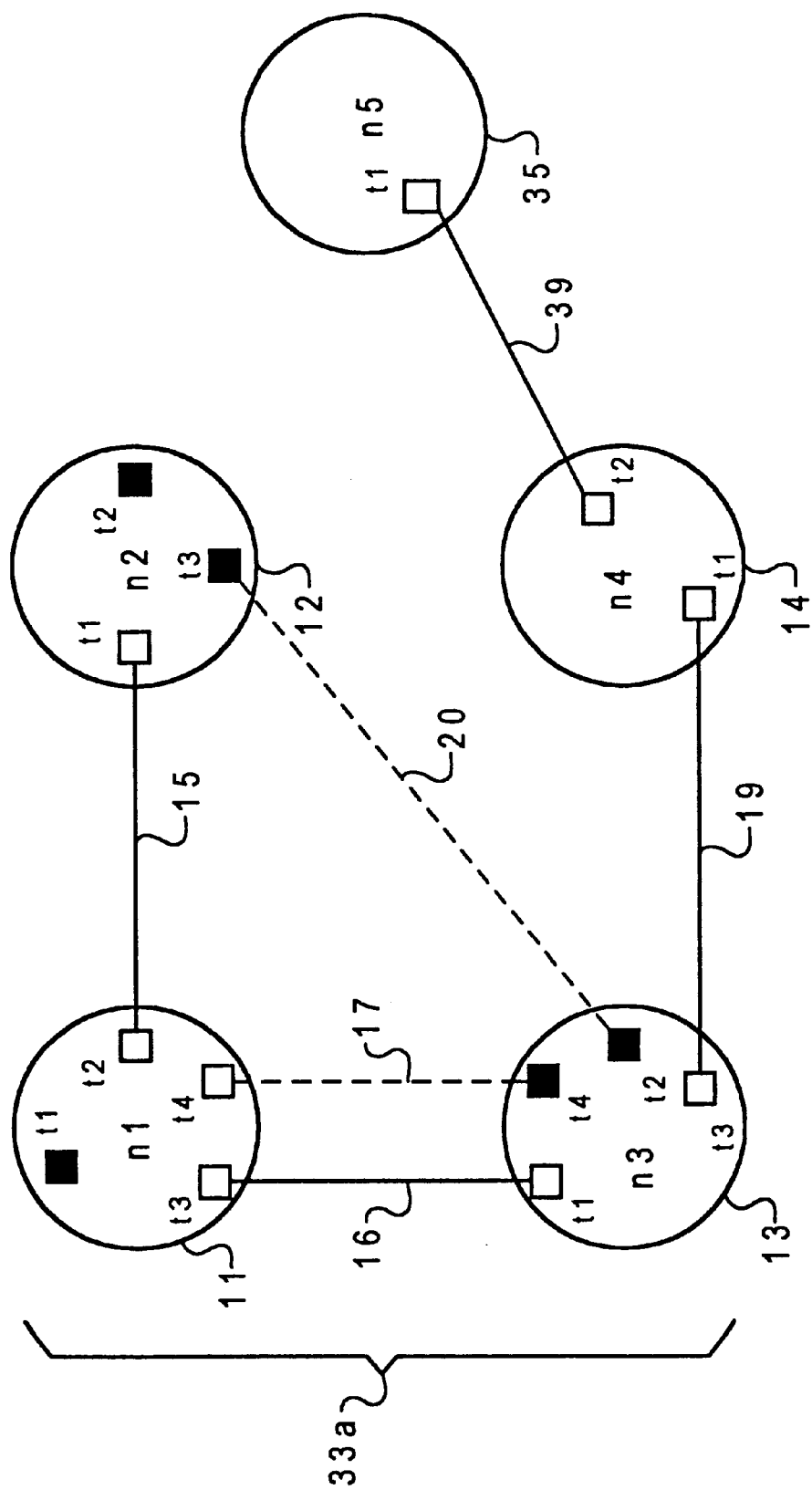
FIG. 8 is a diagram like FIGS. 3–7, for a node discovery condition of operation of the manager in the network of FIG. 1.

Given the network topology map 33 in FIG. 3, where the n1-node 11 is the gateway and the n4-node 14 is unmanageable, FIG. 8 shows a resulting topology map 33a after discovery has completed due to an enable event. The scenario is as follows: (1) while n4 is unmanageable, a new node n5 is activated; a new trunk connection 39 is established between n4 and n5; (2) the agent 25 in n4 reactivates, and once n4 becomes reachable, it can become manageable; (3) the trunk connection between endpoint (n4, t1) and (n3, t3) is activated, and as a result, the operational status of (n3, t3) changes from disabled to enabled with partner (n4, t1); an enable event is emitted for (n3, t3) and forwarded to the manager from node n3; (4) when the manager 21 receives this event (message) it first changes the display of the trunk endpoint (n3, t3) to reflect enabled status; since the partner of (n3, t3) is (n4, t1) which is currently unmanageable, the manager explores n4 to retrieve its local connectivity information; given the agent 25 in n4 is active, it confirms its trunk connection with n3 and uncovers another enabled trunk endpoint (n4, t2) with partner (n5, t1) which is now a new node n5; (5) the manager 21 continues by exploring node n5, and discovery ends after finding no additional enabled trunk endpoints in n5; upon completion the topology map 33 of FIG. 3 is changed to FIG. 8 which shows the topology map 33a after discovery is performed.

Another feature of interest is the function of EFD or event filtering discrimination, by an agent 25. The manager 21 should be able to define for the agents 25 what events should be reported by messages to the manager, and what events should be filtered or ignored. Thus, the manager can send an EFD message to an agent, and the agent should follow this instruction; if so, then an "EFD exists" condition is noted for that node. If a node is not able to provide this filter function, this may indicate defects or failure modes in the agent, so when EFD is not operative then the manager defaults into a polling mode.

Figure 9:
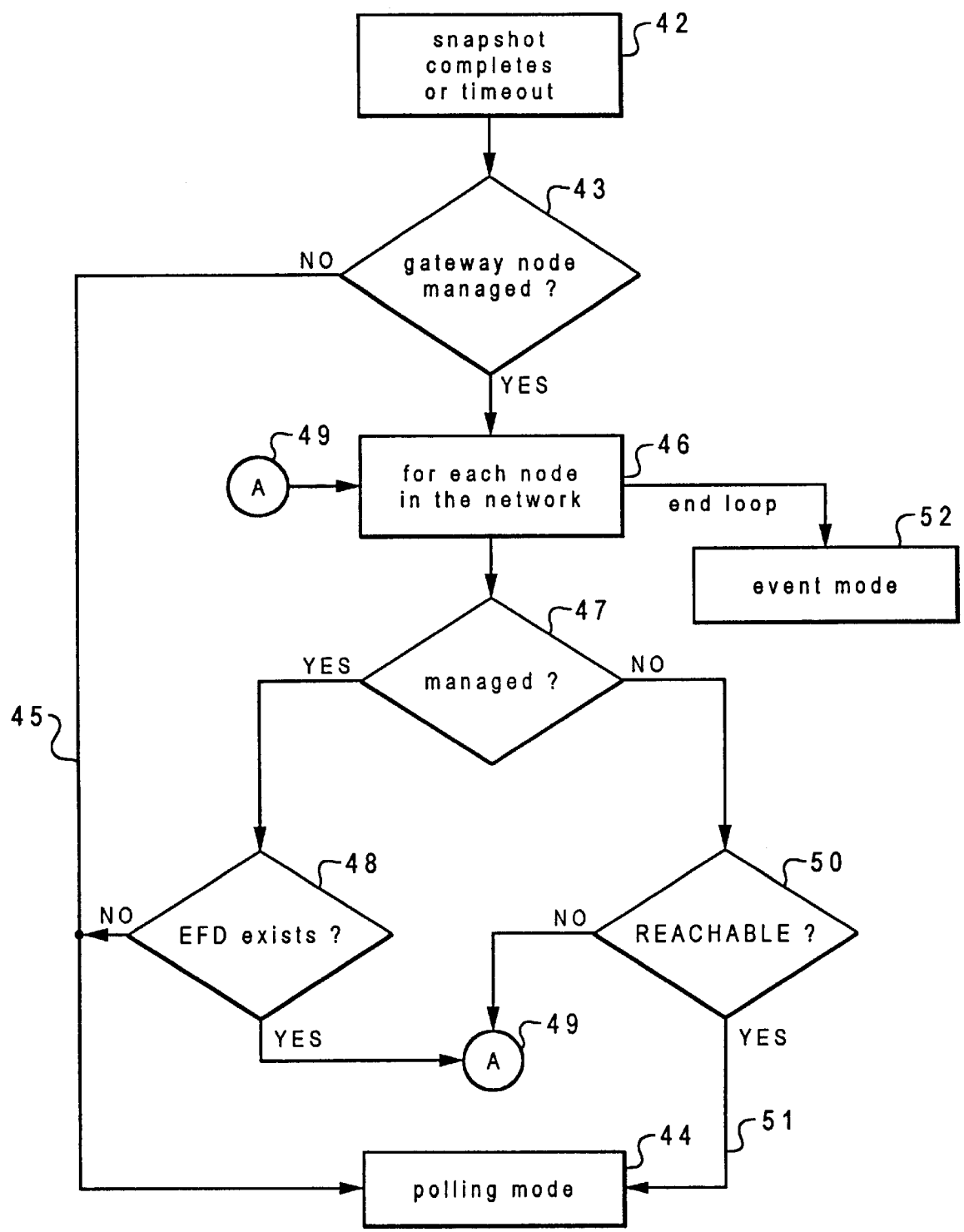
FIG. 9 is a logic flow chart of the process implemented by the system of the invention for switching dynamically between event mode and polling mode.

Referring to FIG. 9, the algorithm executed by the manager 21 to dynamically switch between event monitoring mode and polling monitoring mode is illustrated in flow diagram form. The entry is represented by a block 42 which represents the point that a snapshot completes (polling) or at a timeout (a selected time interval from the last poll). First, it is determined in decision block 43 if the gateway node (n1-node 11 in FIGS. 1–8) is manageable. If not, the manager 21 goes immediately to the polling mode, block 44, via path 45. If so, then control passes to block 46 which is a loop to cycle through (explore) each node in the network and inquire if it is managed, block 47. If so, then control passes to decision block 48 to test if EFD (described above) exists for this node; if not, then the polling block 44 is entered via path 45, or if so then the point A or element 49 represents a return to the loop to examine another node at block 46. If at block 47 it is found that the node is not managed, then an examination is made at block 50 to see if this node is reachable; if not then the point A is used to re-enter the loop at block 47, but if yes (not managed but reachable) then polling mode via block 44 is entered via path 52. Only if all the nodes are examined in the loop and the polling block 44 is not reached, does the control go to block 52, representing the event monitoring mode. Thus, the manager stays in event monitoring mode unless (a) the gateway is inactive, (b) a node is found that is manageable but no EFD exists, or (c) a non-manageable node is reachable.

Figure 10:
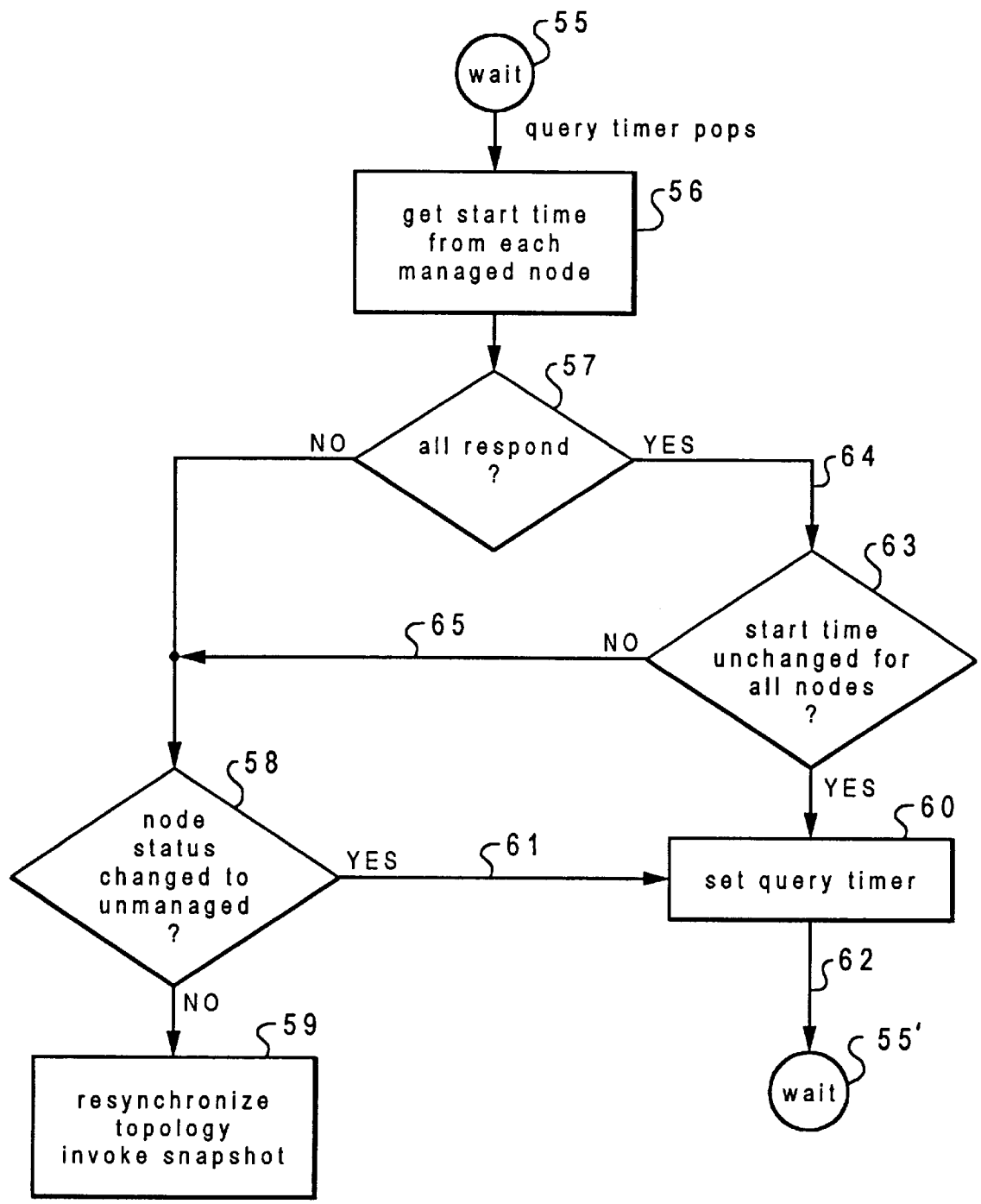
FIG. 10 is a logic flow chart of the process implemented by the system of the invention for making an agent liveliness query.

Referring to FIG. 10, a logic flow chart of the algorithm executed by the manager 21 to perform the agent liveliness query described above, is illustrated. The entry point 55 is a wait condition where the manager idles until a timeout period expires, then a block 56 is entered, where the manager sends messages to all managed nodes requesting the start time (or event counter contents) to be returned. Control goes to a decision point 57 to determine if all nodes have responded within a reasonable period, if not then a decision point 58 is entered to determine if the node status has changed to unmanaged. If not unmanaged, then block 59 is entered to resynchronize the network and invoke a snapshot as described above (after this the block 42 of FIG. 8 would be entered). If unmanaged, then a block 60 is entered via path 61 to set the query timer and thus go back to the wait condition 55' via path 62. If all nodes respond at block 57, then a decision block 63 is entered via path 64, to determine if the start time is unchanged for all nodes, and if so then the set timer block 60 is entered and the manager goes back into wait mode. If a node shows a changed start time in block 63, then the block 58 is entered via path 65. It is thus seen that the process described above is implemented.

While the invention has been particularly shown and described with reference to a preferred embodiment, it will be understood by those skilled in the art that various changes in form and detail may be made therein without departing from the spirit and scope of the invention.

What is claimed is:

1. A network, comprising:

a plurality of nodes coupled by connecting links, each node being capable of sending messages to other nodes and receiving messages from other nodes via said connecting links;

a manager coupled to one of said nodes;

each said node having an agent therein, said agent in each node generating information indicating whether such node is operational, and indicating whether one or more connecting links to other nodes is operational, and each said node responding to requests for said information from said manager, and also sending an unsolicited event message to said manager if any change in operational state of such node is detected; a given one of said nodes being determined to be manageable by said manager if said given one of said nodes responds to a request from said manager for said information for said given one of said nodes; a given one of said nodes being determined to be reachable if an enabled connecting link exists between said manager and said given one of said nodes;

said manager including means for monitoring the topology of said network to produce a topology summary, by
polling said agents by sending said requests to said nodes to collect said information from each of said nodes, and receiving said information from each of said nodes, then
receiving said event messages from said agents in said nodes, and, in response to the contents of said event messages and said liveliness information, dynamically switching between an event-monitoring mode of continuing to receive said event messages for a period of time to continuously update said topology summary, or a polling mode of again polling said agents by sending said requests before the end of said period;

said dynamically switching from said polling mode to said event-monitoring mode occurring when each said node that is reachable is determined to be manageable; said dynamically switching from said event-monitoring mode to said polling mode occurring when any said node that is reachable is determined to be not manageable.

2. A network according to claim 1 wherein each one of said connecting links is a point-to-point link between a separate pair of connection endpoints in a pair of said nodes.

3. A network according to claim 2 wherein each said agent monitors the operational state of said connection endpoints in its node, and includes status of such operational state in said information.

4. A network according to claim 3 wherein said manager also responds to whether an agent responds to said requests, in said function of dynamically switching.

5. A network according to claim 4 wherein said means for monitoring also compares said status of operating state of each of said endpoints, among all of said nodes, in producing said topology summary.

6. A method of monitoring a network of the type having a plurality of nodes coupled by connecting links, comprising the steps of, from a manager at one of said nodes:

determining whether or not each of said nodes is reachable from said manager by an enabled path via said connecting links;

determining whether or not each of said nodes is manageable by responding to requests for local connectivity information for a node; a given one of said nodes being determined to be manageable if said given one of said nodes responds to a request from said manager for local connectivity information for said given one of said nodes;

in response to said steps of determining, dynamically switching between a polling mode of monitoring topology of said network and an event-monitoring mode of monitoring topology of said network, wherein
said polling mode of monitoring includes sending a request from said manager to each node for local connectivity information for said node; and
said event-monitoring mode of monitoring includes waiting for messages sent to said manager from said nodes when a change in local connectivity information is detected by a node;

said dynamically switching from said polling mode to said event-monitoring mode occurring when each said node that is reachable is determined to be manageable; said dynamically switching from said event-monitoring mode to said polling mode occurring when any said node that is reachable is determined to be not manageable.

7. A method according to claim 6 including the step of:
determining whether or not each of said nodes is continuously active by recovering continuity information from each node, by said manager.

8. A method according to claim 7 wherein said step of dynamically switching is also in response to said continuity information from each node.

9. A method according to claim 6 including the step of:
in each said node, determining by an agent in each node whether or not each of said nodes is active and is connected to one or more of the other nodes by an enabled connection, and said connectivity information including identity of each said enabled connection.

10. A method according to claim 6 wherein each one of said connecting links is a point-to-point link between a separate pair of connection endpoints in a pair of said nodes.

11. A method according to claim 6 wherein each one of said agents performs the step of:
monitoring the operational state of said connection endpoints in its node, and sends status of such operational state in said information.

12. A method according to claim 11 wherein said manager also performs the step of:
controlling said dynamic switching in response to whether the operational state of said connection endpoints, as contained in said connectivity information, is consistent among all of said nodes.

13. A method according to claim 6 wherein said manager also performs the step of:
controlling said dynamic switching in response to whether an agent responds to said requests.

14. A method according to claim 6 wherein said manager also performs the step of:
determining whether or not each of said nodes reports consistent information about enabled paths between a node and other nodes.

15. A method according to claim 6 wherein said manager also performs the step of:
generating and visually displaying a topology map summarizing all of said connectivity information received from said nodes.

16. A network monitoring system for a network of the type having a plurality of nodes coupled by connecting links, comprising:

a manager at one of said nodes;

means at said manager for determining whether or not each of said nodes is reachable from said manager by an enabled path via said connecting links;

means at said manager for determining whether or not each of said nodes is manageable by responding to requests for local connectivity information for a node; a given one of said nodes being determined to be manageable if said given one of said nodes responds to a request from said manager for local connectivity information for said given one of said nodes;

means at said manager for dynamically switching between a polling mode of monitoring topology of said network and an event-monitoring mode of monitoring topology of said network, in response to said steps of determining, wherein said polling mode of monitoring includes sending a request from said manager to each node for local connectivity information for said node; and said event-monitoring mode of monitoring includes waiting for messages sent to said manager from said nodes when a change in local connectivity information is detected by a node;

said dynamically switching from said polling mode to said event-monitoring mode occurring when each said node that is reachable is determined to be manageable; said dynamically switching from said event-monitoring mode to said polling mode occurring when any said node that is reachable is determined to be not manageable.

17. A system according to claim 16 including:

means at said manager for determining whether or not each of said nodes is continuously active by recovering continuity information from each node.

18. A system according to claim 17 wherein said means for dynamically switching is also responsive to said continuity information from each node.

* * * * *